(12) United States Patent
Chen et al.

(10) Patent No.: US 7,639,495 B2
(45) Date of Patent: Dec. 29, 2009

(54) COMPUTER PANEL FOR PROTECTING OPTICAL DISC DRIVE

(75) Inventors: Yun-Lung Chen, Taipei Hsien (TW); Qing-Hao Wu, Shenzhen (CN); Jian Hu, Shenzhen (CN)

(73) Assignees: Hong Fu Jin Precision Industry (ShenZhen) Co., Ltd., Shenzhen (TW); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 428 days.

(21) Appl. No.: 11/737,150

(22) Filed: Apr. 19, 2007

(65) Prior Publication Data

US 2008/0151508 A1    Jun. 26, 2008

(30) Foreign Application Priority Data

Dec. 22, 2006    (CN) .................... 2006 2 0016706 U

(51) Int. Cl.
H05K 5/00 (2006.01)
H05K 7/00 (2006.01)
(52) U.S. Cl. ................ 361/679.6; 361/679.58; 361/679.59; 312/223.2
(58) Field of Classification Search ............ 361/679.58, 361/679.59, 679.6, 679.02; 312/223.2
See application file for complete search history.

(56) References Cited

U.S. PATENT DOCUMENTS

| 5,351,228 | A  | * | 9/1994  | Kanno et al. | 720/647 |
| 6,512,729 | B2 |   | 1/2003  | Shih         |         |
| 7,055,160 | B1 | * | 5/2006  | Tan et al.   | 720/647 |
| 7,431,408 | B2 | * | 10/2008 | Lai          | 312/223.1 |

* cited by examiner

Primary Examiner—Jayprakash N Gandhi
Assistant Examiner—Anthony M Haughton
(74) Attorney, Agent, or Firm—Frank R. Niranjan

(57) ABSTRACT

A computer panel for protecting an optical disc drive includes a panel base defining an opening, a cover and a rotating member. A guiding rail is defined in the panel base in a direction perpendicular to a moving direction of the disc tray extending in or out the opening. A connecting bar extends from the cover and one end thereof is received in the guiding rail and slidable therein. The rotating member is connected between the panel base and the cover with one end thereof pivotally positioned on the panel base and the other end pivotally connected to the connecting bar. Wherein the pivot member is driven to rotate outward due to the disc tray of the optical disc drive extending outward to push the cover, thereby pulling the connecting bar to slide up in the guiding rail and driving the cover to rotate outward and expose the opening.

20 Claims, 4 Drawing Sheets

COMPUTER PANEL FOR PROTECTING OPTICAL DISC DRIVE

BACKGROUND OF THE INVENTION

1. Field of the Invention

The present invention relates to computer panels, particularly to a computer panel with a protective cover for protecting an optical disc drive.

2. Description of Related Art

An optical disc drive is generally provided in a computer enclosure with a protective cover. In operation, the protective cover needs to open for extension of a disc tray from the optical disc drive. Conventionally, one of the methods for opening the protective cover includes a protective cover pivotally connected to the computer enclosure, a gear portion formed on the protective cover, a gear group coupled to the gear portion on the cover, and a driving motor. The driving motor provides power to drive the gear group to rotate, and the gear portion on the cover is forced to rotate with the gear group, thereby driving the protective cover to open for extension of the disc tray. However, this method of using a motor and a gear group to open the cover is too complex, occupies much space in the computer enclosure, and adds to the cost of manufacture.

What is needed, therefore, is a computer panel with a protective cover having a simple structure, for protecting an optical disc drive.

SUMMARY OF THE INVENTION

A computer panel for protecting an optical disc drive includes a panel base defining an opening, a cover and a rotating member. A guiding rail is defined in the panel base in a direction perpendicular to a moving direction of the disc tray extending in or out the opening. A connecting bar extends from the cover and one end thereof is received in the guiding rail and slidable therein. The rotating member is connected between the panel base and the cover with one end thereof pivotally positioned on the panel base and the other end pivotally connected to the connecting bar. Wherein the pivot member is driven to rotate outward due to the disc tray of the optical disc drive extending outward to push the cover, thereby pulling the connecting bar to slide up in the guiding rail and driving the cover to rotate outward and expose the opening.

Other advantages and novel features of the present invention will become more apparent from the following detailed description of preferred embodiment when taken in conjunction with the accompanying drawings, in which:

DETAILED DESCRIPTION OF THE INVENTION

Figure 1:
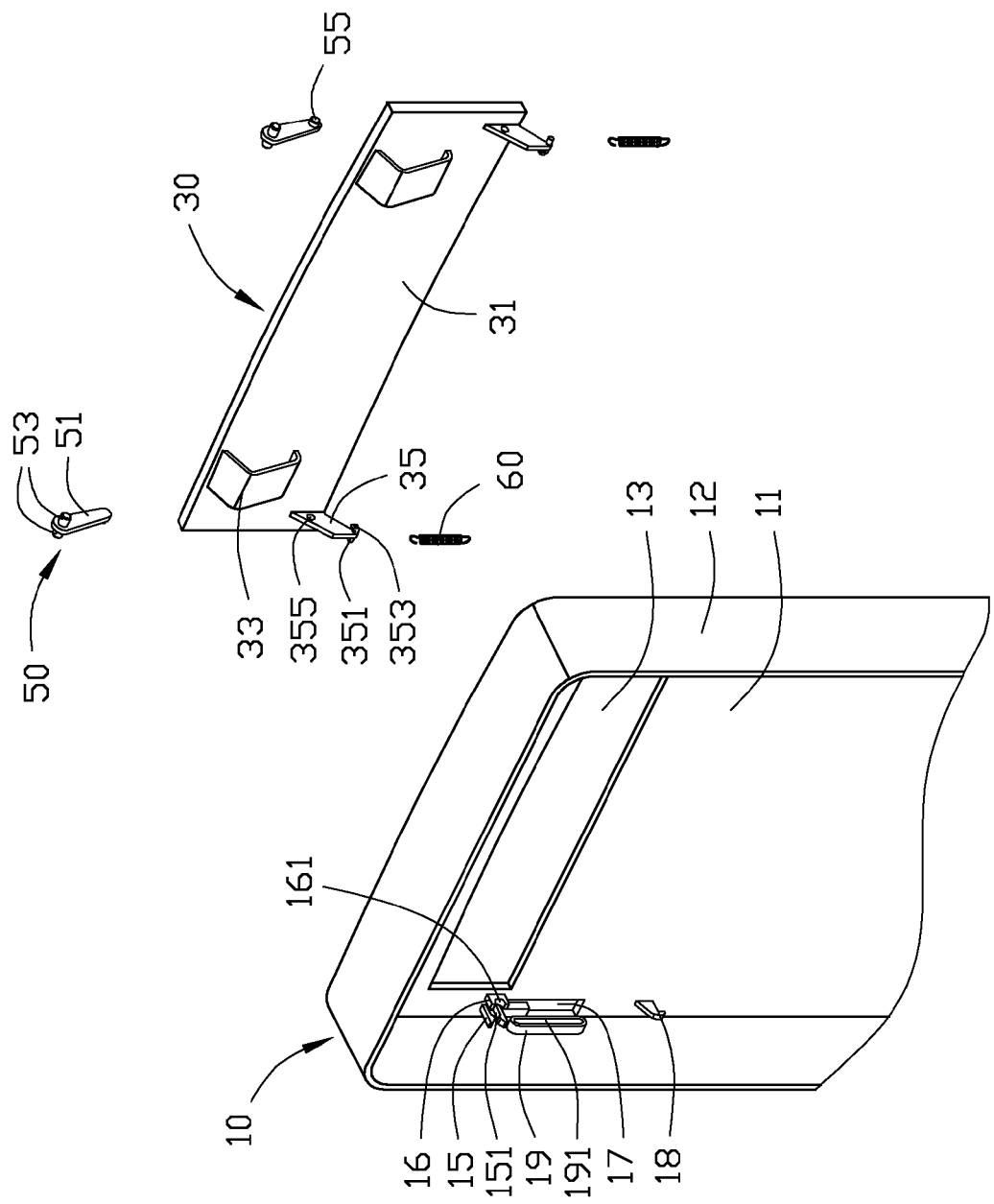
FIG. 1 is an exploded, isometric view of a computer panel with a protective cover for an optical disc drive in accordance with a preferred embodiment.

Referring to FIG. 1, a computer panel with a protective cover for protecting an optical disk drive mounted in a computer enclosure, includes a panel base 10, a cover 30 pivotably connected to the panel base 10, a pair of pivot members 50, and a pair of springs 60 connected between the panel base 10 and the cover 30.

The panel base 10 includes a rectangular plate 11 and a pair of opposite side walls 12 perpendicular to the plate 11. A rectangular opening 13 is defined in the plate 11 configured for providing a path for a disc tray to extend from an optical disc drive mounted therein. A pair of opposite elastic clasps 15 protrudes from each of two sides of an inner side of the plate 11 adjacent to the side walls 12. An accommodating space 151 is defined between each pair of opposite elastic clasps 15. A tab 16 parallel to each pair of the clasps 15 with a semicircular receiving recess 161 defined in a center portion thereof, protrudes from the inner side of the plate 11. A pair of trapezoidal receiving slots 17 is respectively defined in the plate 11 below each of pair of clasps 15. A hook 18 in vertical alignment with each of the receiving slots 17 protrudes from the plate 1. The hook 18 includes a claw extending down. An elliptical block 19 protrudes from the corresponding side wall 12 adjacent to each of the receiving slots 17. A thin guiding slot 191 is defined in each block 19 in a direction along a short side of the opening 13.

The protective cover 30 includes a rectangular base 31. The base 31 includes a first end movably connected to the panel base 10 and a second end free and movable relative to the panel base 10. A pair of bridge members 33 is formed on an inner side of the base 31 facing the opening 13 of the panel base 10 at a position closely adjacent to the free end of the base 31. Each bridge member 33 is formed by two slanted planes converged together. A pair of parallelogram-shaped connecting bars 35 slantedly protrudes down and toward the plate 11 of the panel base 10 from the first end of the base 31. A pivot hole 355 is defined in each connecting bar 35 at a most upper corner adjacent to the base 31. A sliding post 351 protrudes out toward the side wall 12 of the panel base 10 from one side of a corner of the connecting bar 35 furthest away from the base 31, for sliding in the guiding slot 191. A hook 353 with a claw extending up protrudes from the other side of the corner of the connecting bar 35.

Each of the pivot members 50 includes a base 51. The base 51 includes a first end pivotally received between the hooks 15 and the tab 16 and a second end pivotally connected to the cover 30. A pair of first pivot posts 53 respectively protrudes out from two sides of the base 51 at the first end thereof. In assembly, one first pivot post 53 is received in the accommodating space 151 and blocked by the pair of elastic clasps 15, the other first pivot post 53 is received in the semicircular receiving recess 161. A second pivot post 55 for extending through the pivot hole 355 of the connecting bar 35 of the cover 30 protrudes out from one side of the base 51 at the second end thereof. The second end of the base 51 may move with the cover 30.

Figure 2:
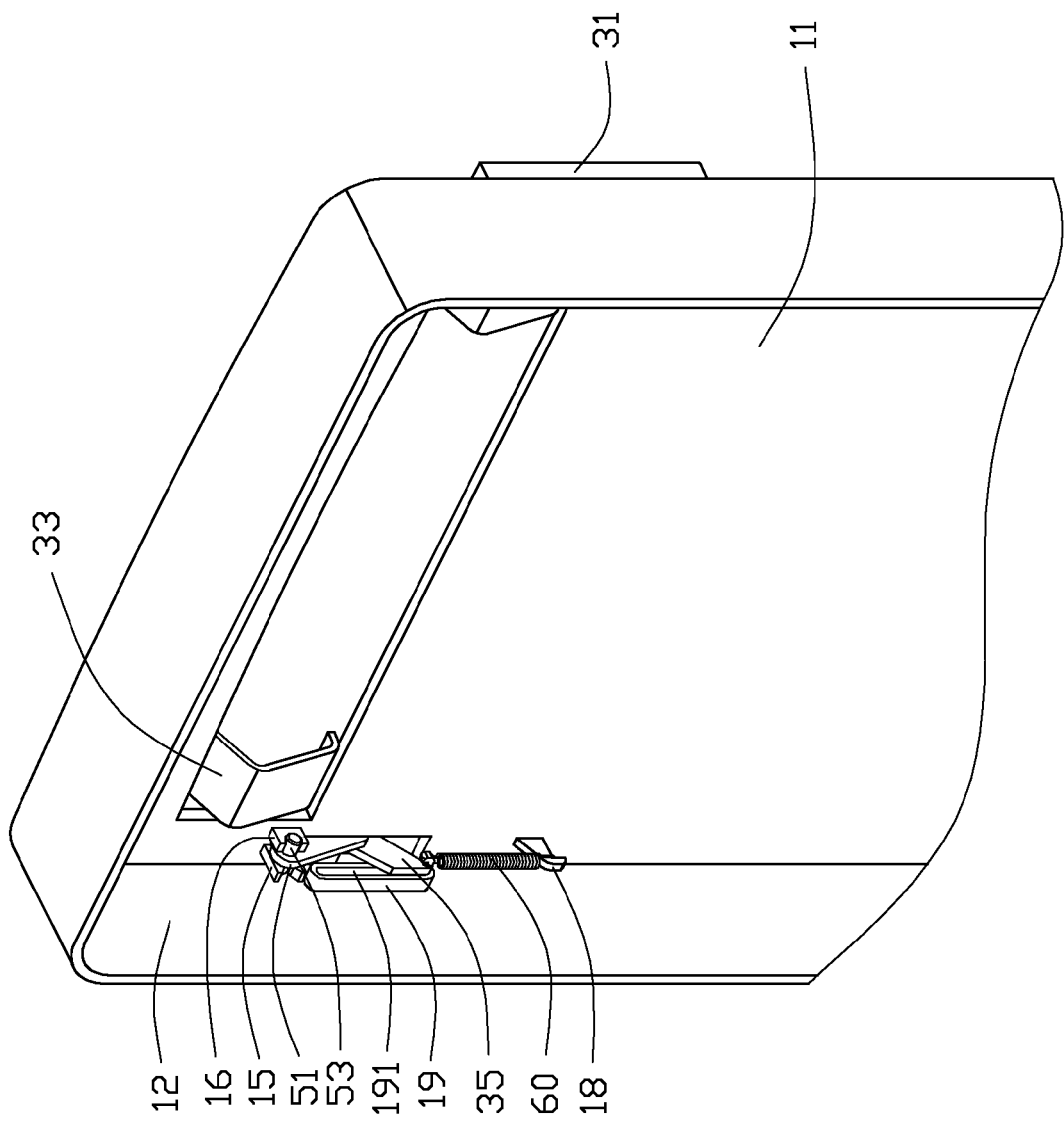
FIG. 2 is an assembled view of the computer panel of FIG. 1.

Referring also to FIG. 2, in assembly, the connecting bars 35 of the cover 30 extend through the corresponding receiving slots 17 from outside of the plate 11. The sliding posts 351 are inserted in the corresponding guiding slots 191 of the elliptical blocks 19. The first ends of the pivot members 50 are disposed between the clasps 15 and the tab 16. The first pivot posts 53 of the first ends are respectively received in the accommodating space 151 and the receiving recess 161. The second ends of the pivot members 50 are extended into the corresponding receiving slot 17 from the inner side of the panel base 10 and the second pivot posts 55 thereof engage in the corresponding pivot holes 355 of the connecting bars 35. One end of each spring 60 is fixedly connected to the corresponding hook 18 of the panel base 10, and the other end of each spring 60 is connected to the corresponding hook 353 of the cover 30. In an initial state, the springs 60 are stretched to provide resistance for retaining the sliding posts 351 of the connecting bar 35 in a bottom end of the guiding slot 191, thereby the cover 30 abuts against the out side of the plate 11 to close the opening 13.

Figure 3:
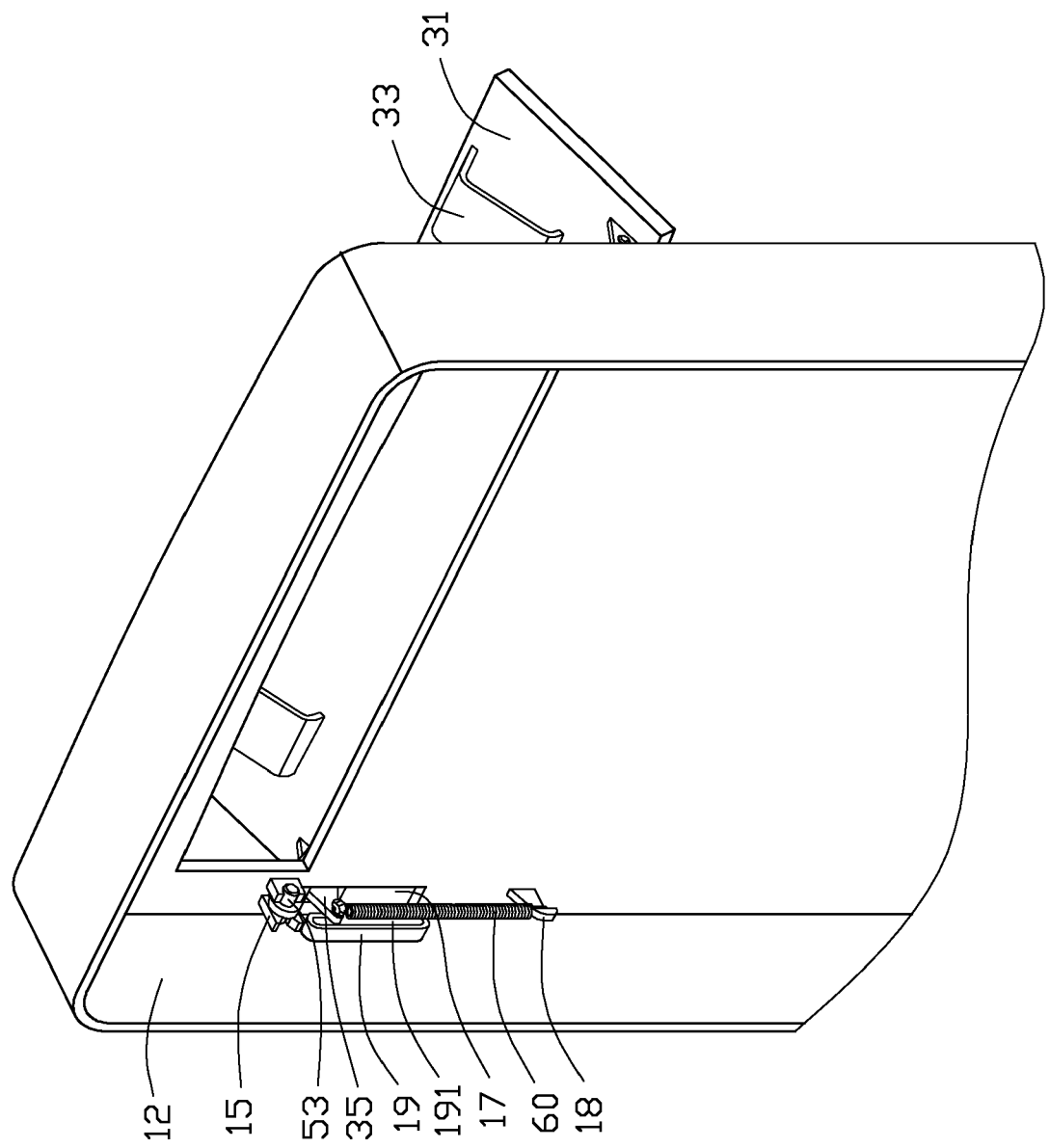
FIG. 3 is an assembled view of the computer panel of FIG. 1 when the protective cover is rotated open.
Figure 4:
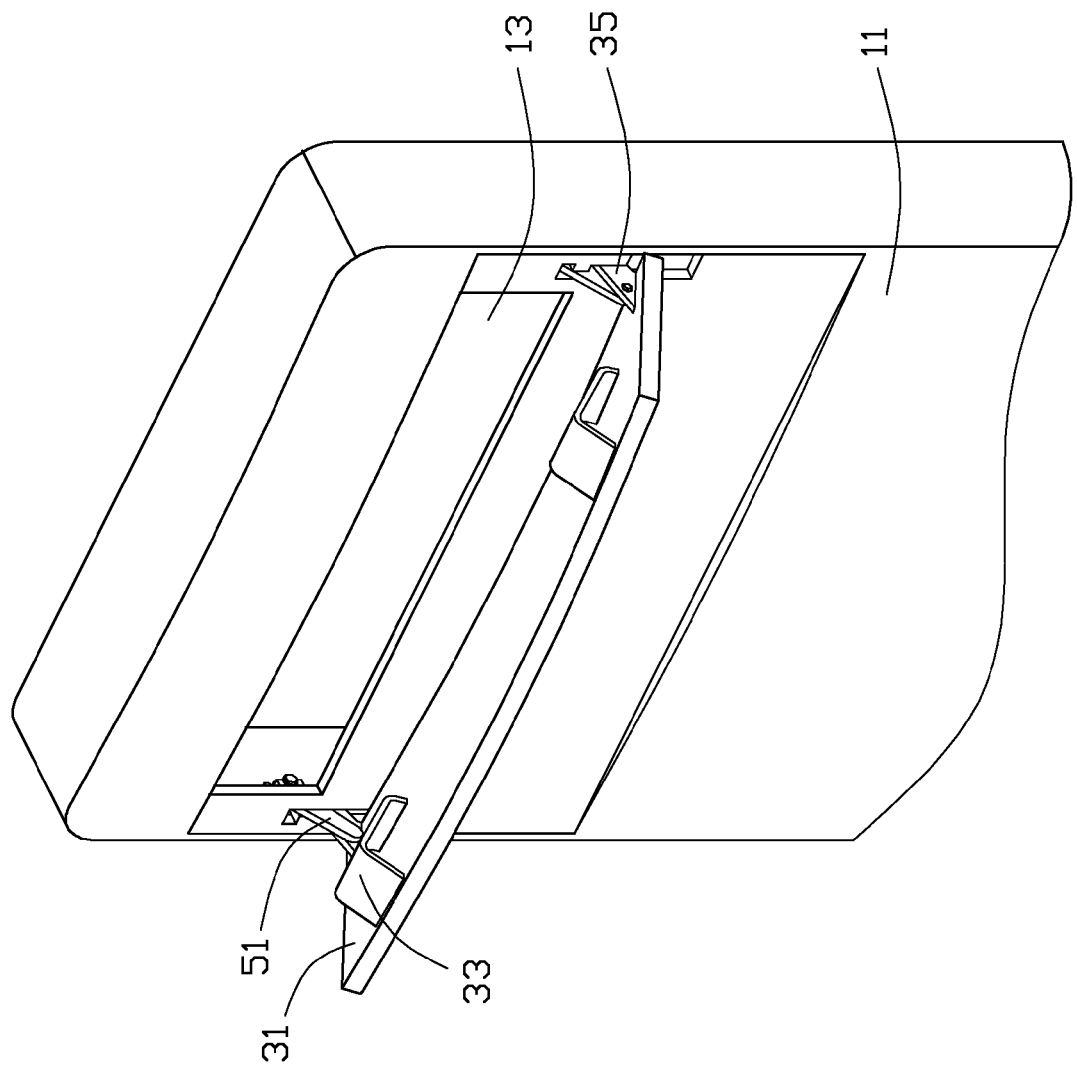
FIG. 4 is similar to FIG. 3, but viewed from another aspect.

Referring also to FIGS. 3 and 4, in operation, a disc tray mounted inside the computer enclosure extends from an optical disc drive toward the opening 13 of the panel base 10, thereby providing a driving force to push the bridge member 33 outward. The base 31 of the cover 30 is forced to move outward away from the plate 11 of the panel base 10. The connecting bars 35 of the cover 30 tend to move outward with the base 31 and cause the pivot members 50 connected thereto to rotate outward about the pivot posts 53 thereof, thereby further driving the sliding posts 351 of the connecting bars 35 slide up in the guiding slots 191 of the elliptical blocks 19. The ends of the springs 60 connected to the hooks 353 of the connecting bars 35 are forced to move up with the connecting bars 35, thereby the springs 60 are stretched further in a vertical direction along the guiding slots 191. When the cover 30 moves outward to a position where a top edge thereof is lower than a bottom edge of the disc tray, the opening 13 is exposed to permit the disc tray to extend therefrom and abut on the top of the bridge member 33. When the disc tray retracts back into the computer enclosure from the opening 13 of the panel base 10, the driving force applied on the cover 30 is withdrawn. The springs 60 retract down to pull the connecting bars 35 of the cover 30 to move with the springs 60 along the guiding slots 191. Simultaneously, the connecting bars 35 pull the pivot members 50 to rotate back toward the plate 11 of the panel base 10, thereby the pivot members 50 further urge the cover 30 to move toward the plate 11 and cover the opening 13 of the panel base 10, for protecting the optical disc drive.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A panel for protecting an optical disc drive, comprising:
a panel base having a plate defining an opening configured for extension of a disc tray from the optical disc drive, a guiding rail defined in the panel base in a direction perpendicular to a moving direction of the disc tray along which the disc tray extends in or out the opening;
a cover moveably connected to the panel base for covering the opening, at least one connecting bar extending from the cover and having one end being received in the guiding rail and slidable therein;
at least one rotating member connected between the panel base and the cover with one end thereof pivotally positioned on the panel base and the other end pivotally connected to the connecting bar; and
at least one spring with one end fixedly positioned on the plate of the panel base and the other end connected to the connecting bar of the cover;
wherein when the disc tray extends to push the cover outward, the one end of the connecting bar is driven to slide up in the rail close to the rotating member and stretch the spring, and the other end of the rotating member connected to the connecting bar rotates out about the one end pivotally positioned on the panel base to drive the cover to rotate away from the plate, and when the disc tray retracts back into the opening, the spring retracts to pull the connecting bar to cause the cover to move back to cover the opening.

2. The panel as described in claim 1, wherein the cover comprises a base, the at least one connecting bar is parallelogram-shaped and slantedly protrudes down and toward the plate of the panel base from a bottom end of the base, at least one receiving slot is defined in the plate for the connecting bar and the pivot member together extending therethrough.

3. The panel as described in claim 2, wherein the connecting bar defines a pivot hole at one end thereof adjacent to the base of the cover, a pivot post protrudes from one end of the pivot member for engaging in the pivot hole.

4. The panel as described in claim 3, wherein a sliding post protrudes from one side of the connecting bar at a distal free end thereof for sliding in the guiding rail of the panel base.

5. The panel as described in claim 4, wherein a hook protrudes from the other side of the connecting bar, another hook protrudes from the plate under the receiving slot, the spring is mounted between the two hooks.

6. The panel as described in claim 3, wherein a pair of opposite clasps which together defines an accommodating space protrudes from an inner side of the plate above the receiving slot thereof, a tab with a receiving recess defined therein protrudes from the plate in parallel to the clasps, a pair of pivot posts protruding out from two sides of the pivot member at the other end thereof is respectively received in the accommodating space and receiving recess.

7. The panel as described in claim 4, wherein the panel base comprises a pair of side walls perpendicular to the plate, at least one elliptical protrusion with an elongated guiding slot defined therein is formed on one of the side walls adjacent to the receiving slot of the plate, the guiding slot forming the rail.

8. The panel as described in claim 2, wherein at least one bridge member is formed on the inner side of the base of the cover by two slanted planes converged together, configured for the disc tray of the optical disc drive abutting thereon to push the cover.

9. A panel for protecting an optical disc drive, comprising:
a panel base having a plate defining a rectangular opening configured for the extension of a disc tray from an optical disc drive, a guiding rail defined in the panel base in a direction perpendicular to a moving direction of the disc tray along which the disc tray extends in or out the opening;
a cover moveably connected to the panel base for closing the opening, at least one connecting bar extending from the cover and having one portion being received in the guiding rail and slidable therein; and
at least one rotating member connected between the panel base and the cover with one end thereof pivotally positioned on the panel base and the other end pivotally connected to the connecting bar;
wherein the pivot member is driven to rotate outward by a force provided by the disc tray of the optical disc drive pushing the cover when it is extended outward, thereby pulling the connecting bar to slide up in the guiding rail and driving the cover to rotate outward and expose the opening.

10. The panel as described in claim 9, wherein the cover comprises a base, the at least one connecting bar is parallelogram-shaped and slantedly protrudes down and toward the plate of the panel base from a bottom end of the base, at least one receiving slot is defined in the plate for the connecting bar and the pivot member together extending therethrough.

11. The panel as described in claim 10, wherein the connecting bar defines a pivot hole at one end thereof adjacent to the base of the cover, a pivot post protrudes from one end of the pivot member for engaging in the pivot hole.

12. The panel as described in claim 11, wherein a sliding post protrudes from one side of the connecting bar at a distal free end thereof for sliding in the guiding rail of the panel base.

13. The panel as described in claim 12, wherein a hook protrudes from the other side of the connecting bar, another hook protrudes from the plate under the receiving slot, the spring is mounted between the two hooks.

14. The panel as described in claim 11, wherein a pair of opposite clasps which together defining an accommodating space protrudes from an inner side of the plate above the receiving slot thereof, a tab with a receiving recess defined therein protrudes from the plate in parallel to the clasps, a pair of pivot posts protruding out from two sides of the pivot member at the other end thereof is respectively received in the accommodating space and receiving recess.

15. The panel as described in claim 12, wherein the panel base comprises a pair of side walls perpendicular to the plate, at least one elliptical protrusion with a long vertical guiding slot defined therein is formed on one of the side walls adjacent to the receiving slot of the plate.

16. The panel as described in claim 10, wherein at least one bridge member is formed on the inner side of the base of the cover by two slanted planes converged together, configured for the optical disc drive abutting thereon.

17. A panel for protecting a data storage device, comprising:

a panel base having a plate defining an opening configured for extension of the data storage device therethrough, a guiding rail defined in the panel base in an up-and-down direction perpendicular to a moving direction of the data storage device along which the data storage device extends in or out the opening;

a cover pivotably connected to the panel base for covering the opening, at least one connecting bar having one end being slidable along the guiding rail when the cover is pivoted relative to the panel base, and an other end connected to one side of the cover;

at least one rotating member connected between the panel base and the cover with one end thereof pivotally positioned to the panel base and the other end pivotally connected to the connecting bar configured for pulling the connecting bar, when the data storage device extends out the opening to push the cover outward, to cause the one end of the connecting bar sliding upward along the rail, whereby the other side of the cover rotates downward to expose the opening; and an elastic device mounted to the panel base configured for returning the cover back to cover the opening after the data storage device extends in the opening.

18. The panel as claimed in claim 17, wherein the other end of the at least one rotating member is pivotally connected to the other end of the connecting bar.

19. The panel as claimed in claim 17, wherein the panel base defines a slot, the rail is provided at inside of the panel base and defines a guiding slot, and the one end of the at least one connecting bar extends through the slot of the panel base from outside of the panel base and has a pivot post fixed thereat, the pivot post being slidably received in the guiding slot of the rail.

20. The panel as claimed in claim 17, wherein the elastic device comprises at least one spring of which one end is secured to the panel base and the other end is secured to one of the at least one connecting bar, the at least one pivoting member and the cover.

* * * * *